UNITED STATES PATENT OFFICE.

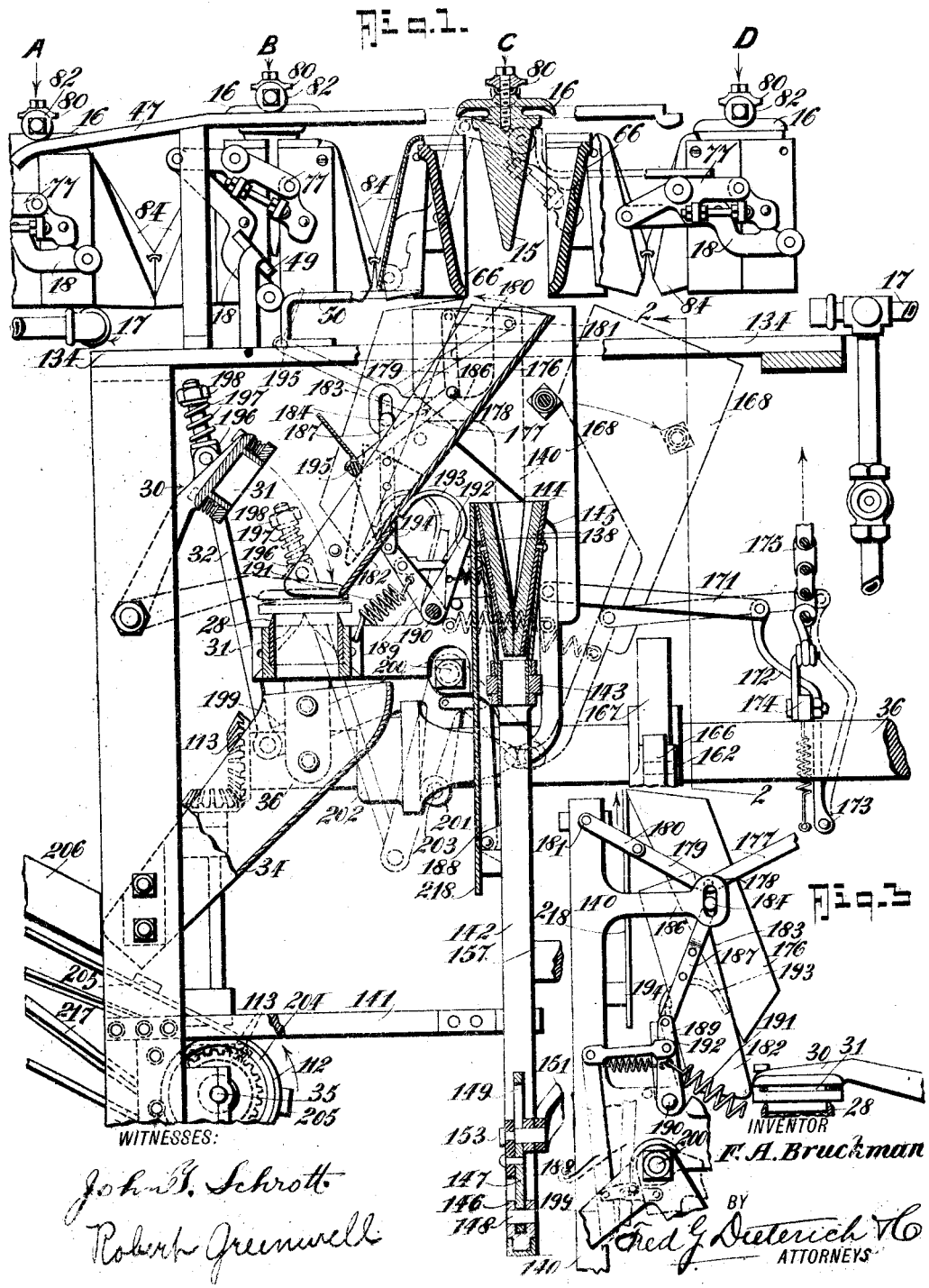

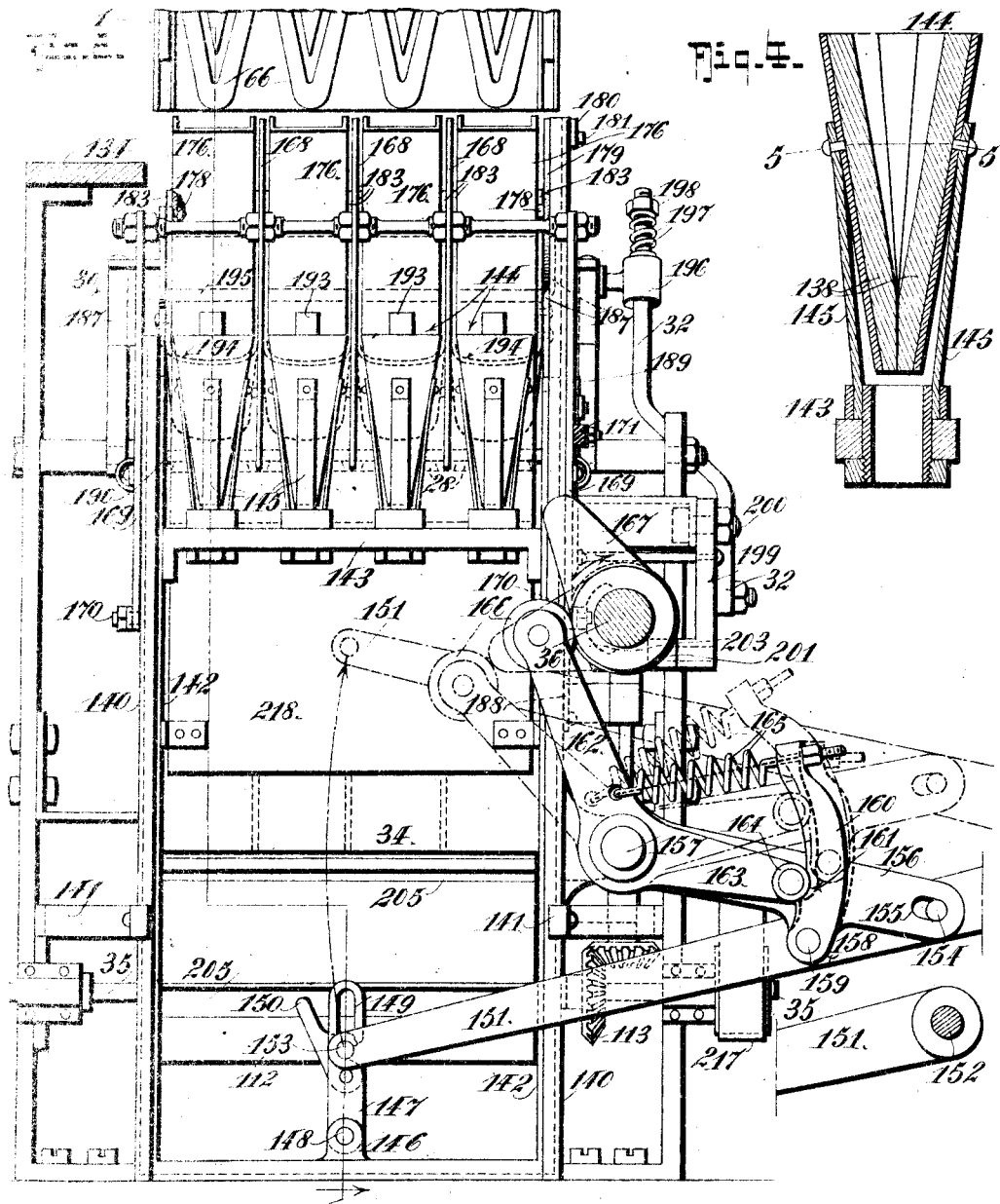
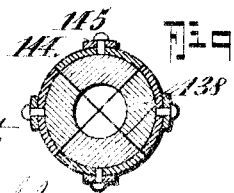

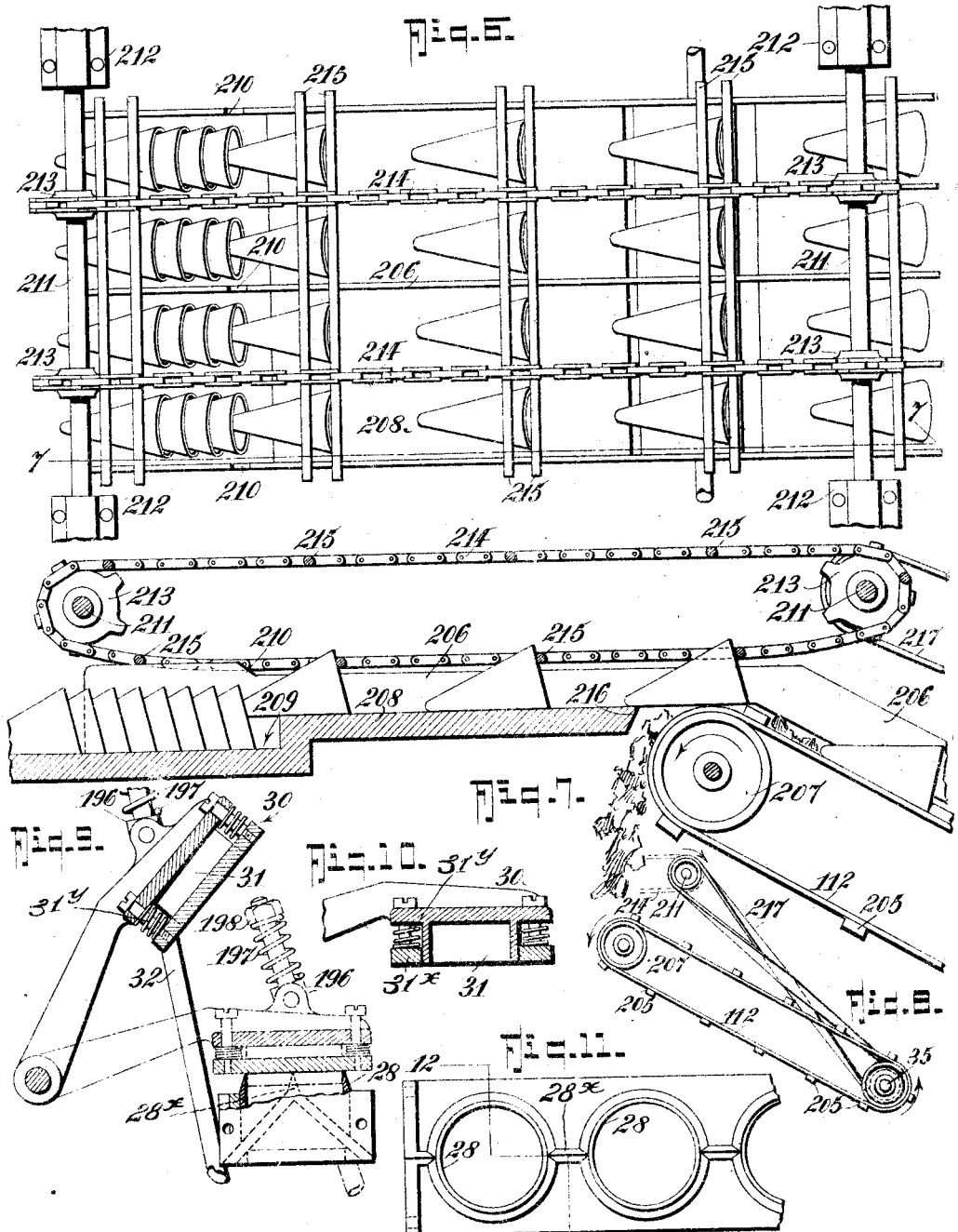

FREDERICK A. BRUCKMAN, OF PORTLAND, OREGON.

ICE-CREAM-CONE MACHINE.

1,138,450.     Specification of Letters Patent.     Patented May 4, 1915.

Application filed July 18, 1912. Serial No. 710,116.

*To all whom it may concern:*

Be it known that I, FREDERICK A. BRUCKMAN, residing at Portland, in the county of Multnomah and State of Oregon, have invented a new and useful Improvement in Ice-Cream-Cone Machines, of which the following is a specification.

My present invention relates to automatic machines for molding, baking, and trimming the ice cream cones, such for example as that disclosed in my co-pending application, serial #560568, filed May 11, 1910. In that application is disclosed a machine, consisting of a rotatable wheel which turns on a vertical axis and carries a series of radially disposed female mold sections which turn with the wheel; core members are also provided for the mold sections. The mold sections and the cores, in their travel, pass a loading place, at which is located a loading device, by means of which a batter is supplied to the molding devices. After being loaded, the mold devices pass over baking burners, which bake the contents of the molding devices to the desired degree. After the molding devices have been carried around over the heater a sufficient distance, they are automatically opened and the baked product is discharged from the same and passes through a trimming mechanism to a conveyer which removes the trimmed cones from the machine.

My present invention provides a mechanism which comes into operation at the place where the cones are discharged, from the molding devices, for oiling or greasing the cores during the time the discharged cones are passed through the trimmers on to the conveyer that takes them to a nesting place.

The oiler is mounted on a reciprocated frame and on its upward movement it causes the recession of the chute that is located between the molding devices and the trimmer. The oiler also carries a set of partition wings or vanes for the chutes to divide the same into as many sections as there are cones formed in a mold, and means are provided to operate the wings to withdraw them while the oiling act is in process of performance.

The means for nesting the cones in sticks (the number of sticks depending on the number of cones each molding device is adapted to form at a single operation) comprises a nesting table divided by longitudinal partitions, between which partitions, the cones are carried by a nesting conveyer after they are brought up by the conveyer on to which they are deposited from the trimmer, to a depression in the table where the nested sticks of cones are formed by allowing the cones to drop bodily a short distance to a plane beneath the entrant part of the nesting table so that the point of the next nesting cone will freely enter the preceding one and as the succeeding cone is projected into the preceding one the nesting conveyer "lets go." The cones are thus nested in sticks as long as may be desired.

Means are also provided in connection with the nesting mechanism for effecting a separation of the trimmings from the cones.

The present invention also resides in those novel details of construction, combination, and arrangement of parts, all of which will be first fully described and then be specifically pointed out in the appended claims, reference being had to the accompanying drawings, in which:—

Figure 1 is an elevation and part section on the line 1—1 of Fig. 2. Fig. 2 is a cross section on the line 2—2 of Fig. 1. Fig. 3 is a detail side elevation of a part of the chutes and trimmer showing a way of supporting the lower chute section and the upper chute section to coöperate in moving from their normal positions to their receded positions. Fig. 4 is an enlarged vertical section of one of the oiler cups. Fig. 5 is a cross section on the line 5—5 of Fig. 4. Fig. 6 is a top plan view of the nesting table and nesting conveyer. Fig. 7 is a cross section on the line 7—7 of Fig. 6. Fig. 8 is a detail diagrammatic elevation showing how the nesting conveyer is driven from the shaft 35. Fig. 9 is a detail enlarged section of the cone trimmer shown in its trimming position in dotted lines. Fig. 10 is a detail section of the trimmer head showing the integral cylindrical portion for pressing the trimmed cone through the circular trimming knives. Fig. 11 is a plane view of a portion of the cylindrical knives frame. Fig. 12 is a section on the line 12—12 of Fig. 11.

In the drawings in which like numerals and letters of reference indicate like parts in all the figures, 134 designates the upper table part of the supporting frame of the machine on which the unlocking devices 49 and 50, and the relocking devices (not shown) are mounted, that coöperate with the female mold section locking and unlocking levers 18 and 77.

15 are the cores which are carried on the ends 80 of the core carrying levers and 66 designates the female mold sections which coöperate with the core 15 to mold the cone between them.

84 designates the oven sides which are carried by the female mold members 66 while the oven cover 16 is carried by the cores 15 or their supporting arms.

47 is the lifting device which coöperates with the rollers 82 to raise the cores 15 in the female mold sections and strip the cones therefrom before the female sections open up to discharge the cores, and A, B, C and D designate, in Fig. 1, the four positions of the molds with relation to the discharge of the molded product and the reloading of the molding device. At position A, the molds are closed and locked and the product in the same has been baked. As the molding device is moved from the position A to position B, the cores are lifted in the female mold sections to strip them from the molded product and the mold sections are unlocked, but not separated a sufficient distance to discharge the product. When the molding devices arrive at position C, the female mold sections will be fully opened to discharge the molded product and when they arrive at position D the female sections will again be locked, and it is at this position that the molding devices are reloaded by a mechanism which forms no part of the present application, and is therefore not herein disclosed.

The heating burners are indicated by the reference character 17, and all of the foregoing specifically described parts may be of the same construction and operated in the same manner as the corresponding parts set forth in my co-pending application hereinbefore referred to as they *per se*, form no part of the present invention.

Upon a suitable supporting frame 140, which is provided with guides 141, is vertically slidably mounted a frame 142 which lies radially to the pivotal center of the wheel (not shown) which carries the molding devices or, in other words, the frame 142 lies in the plane of the set of cores 15 when they are in position C.

The frame 142 has a cross bar 143 on which the oilers 144 are carried by resilient arms 145.

The oilers 144 are composed of sections, each of which is mounted on an arm 145 and the sections may be lined with an absorbant pad 138 to retain the lubricant. The frame 142 is vertically reciprocated at proper times by a mechanism best shown in Fig. 2 of the drawings, by reference to which it will be observed that the bottom of the frame 142 is provided with a lug 146 to which a link 147 is pivoted, at 148, the link being slotted at 149.

150 is a latch pivoted to the link 147, which latch coöperates with the pin 153 that moves in the slot 149 to connect the link 147 with the lever 151. The lever 151 is pivoted at 152 at a fixed place and carries a pin 154 which projects into the slot 155 at the end of a rocking arm 156 that normally forms a part of the bell crank lever 162—163.

The arm 156 and the bell crank lever 162—163 are both pivoted on a stub shaft 157 to have movement independent of one another. The arm or lever 156 has a projection 158 carrying a stud 159 on which the arc finger 160 is pivoted. The arc finger 160 has a recess 161 to receive the roller 164, that is carried on the end of the short arm 163, of the bell crank, and the finger 160 is continuously held in contact with the roller 164 by a spring 165. The roller 164 normally seats in the recess 161 to thereby cause the bell crank 162—163 and the arm or lever 156 to move as one under normal conditions. The long arm 162 of the bell crank carries a roller 166 which coöperates with the cam 167 on the main bar shaft 36 of the machine.

168 designates a set of partition wings or vanes which are carried by arms 169 that are pivoted at 170 to the frame 140 and the wings 168 are moved from their normal position shown in full lines in Fig. 1 to their withdrawn position shown in dot and dash lines in Fig. 1, through the medium of a lever 172, pivoted at 173, and connected to the wings of a connecting rod 171. When the transversely positioned arm 174 is drawn up by the chain 175 which in turn is connected to an intermittently rotating part of the machine (not shown) the lever 172 and wings 168 will be drawn out as previously explained.

176 designates the upper section of the chute that conveys the cones from the molding devices to the trimmer knives 28. The chute section 176 is pivoted at 178 to a bell crank 177—179, such bell crank being linked by a link 180 to a fixed pivot 181 on the frame 140 and the long arm 177 of the bell crank carries a stop rod or finger 195 for a purpose hereinafter made clear. 182 is the lower chute section to one side of which is riveted an arm 187 having a laterally extended lug 184, movable in a slot in the side supporting arm 186 of the frame 140.

The lower chute section 182 is overlapped as at 194 by the upper chute section 176. The sides, however, which carry the wings 183 form continuations of the wings 168 when the parts are in the normal full line positions shown in Fig. 1.

189 designate levers fixedly mounted on a pivoted shaft 190, on which levers 192 are also loosely mounted. The levers 189 are pivoted to the connecting rods 187, one of the levers 189 being linked to a vertically pivoted lever 188, which in turn is linked to the bell crank 199 as shown in Figs. 1 and 3, while the levers 192 are connected at 193 with the lower extremities of the upper chute sections 176 and thereby form a support for the same.

A spring 191 continuously tends to pull the shaft 190 in a clockwise direction in Fig. 3, or counter-clockwise direction in Fig. 1. 30 designates the pusher which carries a yieldable spring member 31ˣ—31ʸ through circular openings in which plungers 31 are adapted to project when the pusher is in its down position as shown in Fig. 9 so as to force the cones through the trimming knives 28 and cause them to be discharged on the lower stationary chute 34 by which they are directed to the elevating conveyer 112. The pusher 30 has a connecting rod 32 which passes through a bearing lug 196 and carries a spring 197 and check nut 198. The rod 32 pivots to a bell crank 199 which is pivoted at 200 and has its short arm provided with a roller 201 to coöperate with the cam 203 whose hub 202 is secured on the main shaft 36.

28ˣ are radial cutting members which serve to cut the trimmings into halves so that they may drop clear of the knives 28.

35 designates the driving shaft for the elevating conveyer 112 and this shaft is mounted in suitable bearings in the frame of the machine and is driven from the main shaft 36 or any other part of the machine by suitable gearing 113.

The conveyer 112 has slats 205 and passes around the driving sprockets 204. The conveyer 112 also passes around upper sprockets 207 and is separated into a number of longitudinal sections, depending on the number of cones formed by each mold device, through the medium of partitions 206 which extend up to the nesting table 208 and continue along the same as best indicated in Figs. 6 and 7 of the drawings.

The nesting table 208 is separated from the conveyer 112 at 216 a slight distance to allow the cuttings or chips to drop through while the cones pass from the conveyer 112 onto the table 208. The table 208 is provided with a depressed portion 209 so arranged that the point of the cones will deliver without catching into the mouth of the preceding cones as they are moved along the table 208 by the nesting conveyer 214. The nesting conveyer is mounted on sprockets 213, supported on shafts 211 mounted in any suitable bearings 212, and it is provided with a series of spaced transversed rods 215 which engage the cones and move them along the table 208 into the nesting depression 209. As the cones are delivered into one another in the depressed portion of the table, the upward incline 210 of the partitions 206 will be engaged by the rods 215, and the rods 215 will thereby be elevated to disengage the cones at that place.

The conveyer 214 is driven by a chain or belt 217 which passes around a sprocket on the shaft 35.

So far as described, the manner in which my invention operates will be best explained as follows: Assume the parts to be in the full line position indicated in Fig. 1 of the drawings. As the molding devices reach position C, the cones are dropped into the chute 176—182 and fall down until they engage the finger or cross wire 195, by which they are momentarily held. As soon as this act has occurred, (it being understood of course that the molding devices are now stationarily located with the open one at position C) the rod 174 and lever 172 come into operation to withdraw the partition wings 168 into the dot and dash line position shown in Fig. 1, after which the cam 167 comes into operation to cause the frame 142 to be elevated to bring the oiling cups 144 into engagement with the cores 15 to oil the same. As the frame 142 raises, the back plate 218 which is carried by the frame 142, engages the underside of the upper chute section 176 and tends to move it upwardly, as the chute section, however, is secured through the connection 180 to pivot at 181, it will move in a counter-clockwise direction on such pivot 118 until it arrives at the dot and dash line position shown in Fig. 1. In moving from the full line position shown in Fig. 1 to the dot and dash line position shown in Fig. 1, or the full line position shown in Fig. 2, the upper chute section 176 will cause the bell crank 177—179 to be operated to raise the finger 195 upwardly and permit the cones to move into the knives 28. As this occurs, the chute 182 will be brought into the position shown in full lines in Fig. 3, since at this time the cam 203 comes into operation to move the bell crank 199 to bring the pusher 30 down into the dot and dash line position in Fig. 1, thereby pushing the cones through the trimmer 28 and depositing them on the chute 34 together with the trimmings, and since the rod 188 is linked to the bell crank 199 and also to the lever 189, the first said action of moving the chute 182 is accomplished. After the frame 142 has moved upwardly it comes down again to its initial position and in coming down, the upper chute section 176 is released and is brought back by the spring 191 to the full line position shown in Fig. 1. At the same time, the chute section 182 is restored to the full line position shown in Fig. 1 by the tension of a spring, connected to lever 192, its backward movement being limited by the contact of the upper chute section 176 with the lower section 182, so positioning the parts as to be ready for the next operation. As soon as the frame 142 has dropped to its initial position, the arm 174 will recede to move the cam lever 172 in a direction to restore the wings 186 to their initial position between the sections of the chute 176.

As the cones are deposited on to the conveyer 112, they are carried up to the nesting table 208 as before described, and there nested into sticks ready for packing.

While I have shown and described a specific construction of trimmings-separating and cone nesting mechanism, yet in this application I make no claim to such parts, per se, since such construction, per se, forms the subject matter of a divisional application.

From the foregoing description taken in connection with the accompanying drawings, it is thought the complete construction, operation and advantages of the invention will be apparent to those skilled in the art to which it appertains.

What I claim is:—

1. In an ice cream cone machine, a set of molding devices including female mold sections and cores therefor, means for opening and closing said molding devices to discharge the molded product, a trimming mechanism, means for conveying the molded product from the molding devices to the trimming mechanism, said means including a chute, and means for moving said chute into an inoperative position during the action of said trimming mechanism.

2. In an ice cream cone machine, a set of molding devices including female mold sections and cores therefor, means for opening and closing said molding devices to discharge the molded product, means for conveying the molded product from the molding devices, said means including a chute, and means for moving said chute into an inoperative position at times, and means for oiling the mold cores when said chute is in its inoperative position.

3. In an ice cream cone machine, a set of molding devices each including a pair of female mold sections, cores adapted to be projected into said sections, means for opening and closing said female mold sections to discharge the molded product, combined with means for projecting between said female mold sections when open to oil said cores while said cores remain projected between the separated female mold sections.

4. In a machine of the class described, the combination with the molding devices which include cores, of a trimming mechanism, means for conveying the molded product from the molding devices to the trimming mechanism, and means for moving said conveying means to an inoperative position during the action of said trimming mechanism and oiling the mold cores.

5. In a machine of the class described, the combination with the molding devices, of a chute for conveying the molded product from the molding devices and delivering them at a given place, said chute including a set of sections, side partition wings projecting between said sections, a core oiling device, and means for first withdrawing said partition wings and then moving said oiling device to oil said cores.

6. In a machine of the class described, the combination with the molding devices, of a chute for conveying the molded product from the molding devices and delivering them at a given place, said chute including a set of sections, side partition wings projecting between said sections, a core oiling device, and means for first withdrawing said partition wings and then moving said oiling device to oil said cores, and means causing said chute to move out of its operative position as said oiler is moved into engagement with the cores.

7. In a machine of the class described, the combination with the molding devices including cores, of a chute to receive the molded product from said molding devices and convey it away from the same, said chute comprising a plurality of sections, means for first causing said chute sections to move out of their operative position to expose the molded cores from beneath and then applying a lubricant to said cores.

8. In a machine of the class described, the combination with the molding devices including cores, of a chute to receive the molded product from said molding devices and convey it away from said molding devices, said chute comprising a plurality of sections, means for first causing said chute sections to move out of their operative position to expose the molded cores from beneath and then apply a lubricant to said cores, said last named means including a reciprocable frame, oilers mounted on said frame, and means carried by said frame for engaging said chute to cause it to move out from beneath said cores.

9. In a machine of the class described, the combination with the molding devices, of a chute for conveying the molded product from the molding devices, means for mounting said chute for movement into and out of its operative position, partition wings for said chute, an oiling device, and means for first withdrawing said partition wings and then moving said oiling device to displace said chute and oil said cores.

10. In a machine of the class described, the combination with the molding devices, of a chute for conveying the molded product from the molding devices, means for mounting said chute for movement into and out of its operative position, partition wings for said chute, an oiling device, and means for first withdrawing said partition wings and then moving said oiling device to displace said chute and upon further movement oil said cores.

11. In a machine of the class described, the combination with the molding devices including cores, and means—by which the molded product is adapted to be received, a chute for conveying the molded product from the molding devices to said receiving means, means for arresting said molded product in its travel through the chute, means for releasing the molded product to pass along the chute and thereafter moving said chute out of its conveying position.

12. In a machine of the class described, the combination with the molding devices including cores, and means—by which the molded product is adapted to be received, a chute for conveying the molded product from the molding devices to said receiving means, means for arresting said molded product in its travel through the chute, means for releasing the molded product to pass along the chute and thereafter moving said chute out of its conveying position, and means for oiling said mold cores.

13. In a machine of the class described, the combination with the molding devices including cores, and means—by which the molded product is adapted to be received, a chute for conveying the molded product from the molding devices to said receiving means, means for arresting said molded product in its travel through the chute, means for releasing the molded product to pass along the chute and thereafter moving said chute out of its conveying position, and means for oiling said mold cores after said chute has been moved out of its conveying position.

14. In a machine of the class described, the combination with the molding devices including cores, of a chute projecting beneath said molding devices for conveying the molded product from the molding devices, said chute comprising upper and lower pivotally mounted sections, means coöperatively connecting said sections, a reciprocated frame for engaging the upper section to cause said chute to recede from an operative position beneath said molding devices, and means for oiling said cores.

15. In a machine of the class described, the combination with the molding devices including cores, of a chute projecting beneath said molding devices for conveying the molded product from the molding devices, said chute comprising upper and lower pivotally mounted sections, means coöperatively connecting said sections, a reciprocated frame for engaging the upper section to cause said chute to recede from an operative position beneath said molding devices, and means for oiling said cores, means for arresting the molded product in its passage through the chute, and means for releasing the molded product before the chute has completely receded.

16. In a machine of the class described, the combination with the molding devices including cores, of a chute projecting beneath said molding devices for conveying the molded product from the molding devices, said chute comprising upper and lower pivotally mounted sections, means coöperatively connecting said sections, a reciprocated frame for engaging the upper section to cause said chute to recede from an operative position beneath said molding devices, and means for oiling said cores, means for arresting the molded product in its passage through the chute, and means for releasing the molded product before the chute has completely receded, wings projecting at the sides of said chute, and means for withdrawing said wings during the oiling act.

17. In a machine of the class described, the combination with the molding devices including cores, a chute for conveying the molded product from the molding devices, means for arresting said molded product in its travel through the chute, means for releasing the molded product to pass along the chute and thereafter moving said chute out of its conveying position, and means for oiling said mold cores, after said chute has been moved out of its conveying position.

18. In a machine of the class described, the combination with the molding devices including cores, and the trimming mechanism including a cone receiving cutter and a pusher for pushing the cone through the cutter, of means for oiling the cores, and a chute normally held to project into the path of movement of said oiling means and into the path of movement of said pusher to convey the cone from the molding devices to the trimming mechanism while said oiling means and said pusher are inactive, and means for moving said chute out of position and actuating said oiling means and said pusher.

19. In a machine of the class described, the combination with the molding devices including cores, and the trimming mechanism including a cone receiving cutter and a pusher for pushing the cone through the cutter, of means for oiling the cores, and a chute normally held to project into the path of movement of said oiling means and into the path of movement of said pusher to convey the cone from the molding devices to the trimming mechanism while said oiling means and said pusher are inactive, and actuating means for first moving said chute out of position and then effecting the oiling act and the action of said pusher, means for arresting the molded product in its travel through the chute, and means for releasing the molded product to pass along the chute before said chute is moved entirely out of its conveying position.

20. In an ice cream cone machine, a set of molding devices including female mold sections and cores therefor, means for opening and closing said molding devices to discharge the molded product, means for conveying the molded product from the molding devices, said means including a chute, and mechanism for moving said chute into an inoperative position at predetermined times.

21. In a machine of the class described, the combination with the molding devices which include cores, of means for conveying the molded product from the molding devices, and means for moving said conveying means to an inoperative position and oiling the mold cores.

22. In a machine of the class described, the combination with the molding devices including cores, a chute for conveying the molded product from the molding devices, means for arresting said molded product in its travel through the chute, means for releasing the molded product to pass along the chute and thereafter moving said chute out of its conveying position.

23. In a machine of the class described, the combination with the molding devices including cores, and means by which the molded product is adapted to be received, a chute for conveying the molded product from the molding devices to said receiving means, means for arresting said molded product in its travel through the chute, means for moving said chute to first release the molded product to cause it to pass along the chute to the receiving means, and thereafter move said chute completely out of its conveying position.

24. In a machine of the class described, the combination with the molding devices including cores, and means by which the molded product is adapted to be received, a chute for conveying the molded product from the molding devices to said receiving means, means for arresting said molded product in its travel through the chute, means for moving said chute to first release the molded product to cause it to pass along the chute to the receiving means, and thereafter move said chute completely out of its conveying position with respect to said molding devices and said receiving means, and means for oiling said mold cores.

25. In a machine of the class described, the combination with the molding devices including cores, and means by which the molded product is adapted to be received, a chute for conveying the molded product from the molding devices to said receiving means, means for arresting said molded product in its travel through the chute, means for moving said chute to first release the molded product to cause it to pass along the chute to the receiving means, and thereafter move said chute completely out of its conveying position with respect to said molding devices and said receiving means, and means for oiling said mold cores after said chute has been moved out of its conveying position.

26. In a machine of the class described, the combination with the molding devices including cores, a chute for conveying the molded product from the molding devices, means for arresting said molded product in its travel through the chute, means for releasing said arresting means to release the molded product to pass along the chute and thereafter move said chute completely out of its conveying position, and means for oiling said mold cores after said chute has been moved out of its conveying position.

27. In a machine of the class described, the combination with the molding devices including cores, and the trimming mechanism including a cone receiving cutter and a pusher for pushing the cone through the cutter, of means for oiling the cores, and a chute normally held to project in the path of movement of said oiling means and into the path of movement of said pusher to convey the cone from the molding devices to the trimming mechanism while said oiling means and said pusher are inactive, and means for actuating said oiling means to first move said chute out of position and then effect the oiling act, and actuate said pusher, means for arresting said molded product in its travel through the chute, and means for releasing the molded product to pass along the chute before said chute is completely moved out of position.

28. In a machine of the class described, a set of molding devices and a mechanism into which the molded product is to be delivered after it leaves the molding devices, combined with a conveyer for conveying the molded product from the molding devices to the mechanism to which the product is to be delivered, said mechanism to which the product is to be delivered including operative parts into the path of movement of which said conveying mechanism normally projects, and means for moving said conveying mechanism out of its conveying position during the action of said operative parts.

29. In a machine of the class described, the combination with the molding devices, the oiling mechanism therefor and the mechanism for finishing the molded product of means for conveying the molded product from the molding devices to the finishing mechanism, said finishing mechanism including operating devices with the operation of which said conveying means normally interferes, said conveying means normally interfering with the action of said oiling means, and mechanism for moving said conveying means into a non-operative position during the action of said interfering parts.

FREDERICK A. BRUCKMAN.

Witnesses:
J. A. McFeron,
A. A. Hughes.